(12) United States Patent
Zinn et al.

(10) Patent No.: US 9,785,952 B2
(45) Date of Patent: Oct. 10, 2017

(54) CLASSIFICATION AND MANAGEMENT OF KEYWORDS ACROSS MULTIPLE CAMPAIGNS

(75) Inventors: Richard Zinn, Saratoga Springs, UT (US); Brett Michael Error, Orem, UT (US)

(73) Assignee: Adobe Systems Incorporated, San Jose, CA (US)

( * ) Notice: Subject to any disclaimer, the term of this patent is extended or adjusted under 35 U.S.C. 154(b) by 1745 days.

(21) Appl. No.: 11/696,888

(22) Filed: Apr. 5, 2007

(65) Prior Publication Data

US 2007/0168255 A1    Jul. 19, 2007

Related U.S. Application Data

(63) Continuation of application No. 11/554,020, filed on Oct. 28, 2006, now abandoned.

(60) Provisional application No. 60/731,177, filed on Oct. 28, 2005.

(51) Int. Cl.
  *G06Q 30/00*    (2012.01)
  *G06Q 30/02*    (2012.01)

(52) U.S. Cl.
  CPC ......... *G06Q 30/02* (2013.01); *G06Q 30/0254* (2013.01); *G06Q 30/0256* (2013.01); *G06Q 30/0275* (2013.01); *G06Q 30/0277* (2013.01)

(58) Field of Classification Search
  CPC .................................................... G06Q 30/02
  USPC ................................ 705/14, 37, 14.1–14.73
  See application file for complete search history.

(56) References Cited

U.S. PATENT DOCUMENTS

| | | | |
|---|---|---|---|
| 6,381,592 B1 | | 4/2002 | Reuning |
| 7,031,932 B1 | * | 4/2006 | Lipsky et al. ................. 705/14 |
| 7,043,450 B2 | | 5/2006 | Velez et al. |
| 2002/0091879 A1 | | 7/2002 | Beriker |
| 2002/0120505 A1 | * | 8/2002 | Henkin et al. ................. 705/14 |
| 2003/0093285 A1 | | 5/2003 | Colace et al. |

(Continued)

FOREIGN PATENT DOCUMENTS

JP    2005196715    7/2005

OTHER PUBLICATIONS

"Keyster", 10x Marketing Releases New Search Engine Ranking Software, PR Newswire, Mar. 20, 2003, pp. 1-3.*

(Continued)

*Primary Examiner* — Arthur Duran
(74) *Attorney, Agent, or Firm* — Kilpatrick Townsend & Stockton LLP

(57) ABSTRACT

A system for classifying and managing keywords across multiple campaigns comprises a classification manager, a bid management system, a web analytics tool and a search engine. The classification manager interfaces with the bid management system and the web analytics tool to provide user interfaces for reviewing data about specific keywords across multiple campaigns. The classification manager includes a classification keyword repository, a classification creation module, a classification measurement module and a classification user interface module for generating the user interface. This is particularly advantageous because statistics corresponding to keywords can be classified across multiple campaigns to provide greater flexibility in the analysis of web data. The present invention also includes a novel method for the classification of keywords across multiple campaigns.

20 Claims, 11 Drawing Sheets

(56) References Cited

U.S. PATENT DOCUMENTS

| | | | |
|---|---|---|---|
| 2003/0101126 A1* | 5/2003 | Cheung et al. | 705/37 |
| 2005/0065844 A1 | 3/2005 | Raj et al. | |
| 2005/0097204 A1* | 5/2005 | Horowitz et al. | 709/223 |
| 2005/0137939 A1 | 6/2005 | Calabria et al. | |
| 2005/0149396 A1 | 7/2005 | Horowitz et al. | |
| 2005/0154717 A1 | 7/2005 | Watson et al. | |
| 2005/0222901 A1* | 10/2005 | Agarwal et al. | 705/14 |
| 2005/0228797 A1 | 10/2005 | Koningstein et al. | |
| 2006/0026064 A1* | 2/2006 | Collins | 705/14 |
| 2006/0069614 A1* | 3/2006 | Agarwal et al. | 705/14 |
| 2006/0173744 A1* | 8/2006 | Kandasamy et al. | 705/14 |
| 2006/0277102 A1* | 12/2006 | Agliozzo | 705/14 |
| 2007/0027760 A1* | 2/2007 | Collins et al. | 705/14 |
| 2007/0027850 A1* | 2/2007 | Chan et al. | 707/3 |
| 2007/0033104 A1* | 2/2007 | Collins et al. | 705/14 |
| 2007/0067267 A1* | 3/2007 | Ives | 707/3 |
| 2007/0214048 A1* | 9/2007 | Chan et al. | 705/14 |
| 2008/0270223 A1* | 10/2008 | Collins et al. | 705/10 |

OTHER PUBLICATIONS

Google AdWords: Keyword Tool, Google, [online], retrieved on Oct. 28, 2006. Retrieved from the Internet <URL:https://adwords.google.com/select/KeywordToolExternal>.

Yahoo! Search Marketing—Resource Center—Products & Features, [online], retrieved on Oct. 28, 2006. Retrieved from the Internet <URL: http://searchmarketing.yahoo.com/rc/srch/prod.php>.

MSN Advertising—How does Microsoft adCenter work?, [online], retrieved on Oct. 28, 2006. Retrieved from the Internet <URL: http://advertising.msn.com/microsoft-adcenter/how-adcenter-works>.

Traffic Leader Bid Management Technology, [online], retrieved Apr. 3, 2007. Retrieved from the Internet <URL:web.archive.org/web/20051001010431/http://trafficleader.com/>.

Pay-Per_Click Campaign Management, [online], retrieved Apr. 3, 2007. Retrieved from the Internet <URL:http://web.archive.org/web/20050830140644/http://www.advmediapr . . . >.

WebSideStory—Optimize Search Engine Marketing, [online], retrieved Apr. 3, 2007. Retrieved from the Internet <URL:http://web.archive.org/web/20051027011827/http://www.websidestory>.

PCT International Search Report and Written Opinion, PCT/US06/42560, Jan. 22, 2008, 8 pages.

English Translation of Japanese Office Action from Patent Application No. P2008-538110, mailed Oct. 11, 2011, all pages.

Japanese Office Action from Patent Application No. P2008-538110, mailed Oct. 11, 2011, all pages.

JP2003-228676—Untranslated, all pages (translated version above 2003/0093285).

JP2005-276206—Untranslated, Oct. 6, 2005, all pages (translated version above 2005/0154717).

European Search Report from Application No. 06827227.7-2221 / 1952337 (PCT/US2006042560), mailed on Jun. 2, 2010, 6 pages.

* cited by examiner

CLASSIFICATION AND MANAGEMENT OF KEYWORDS ACROSS MULTIPLE CAMPAIGNS

CROSS-REFERENCE TO RELATED APPLICATIONS

This application is a continuation of U.S. patent application Ser. No. 11/554,020, filed Oct. 28, 2006 and entitled "Classification and Management of Keywords across Multiple Campaigns," which claimed priority, under 35 U.S.C. §119(e), to U.S. Provisional Patent Application No. 60/731,177, filed Oct. 28, 2005 and entitled "Classification and Management of Keywords across Multiple Campaigns."

BACKGROUND OF THE INVENTION

1. Field of the Invention

The present invention relates to a system and methods for interfacing with Internet search engines. For example, web analytic systems often include additional modules, such as bid management systems to manage keyword bids and advertising campaigns associated with those key words. In particular, the present invention relates to systems and methods for classification of keywords across multiple campaigns in a bid management system associated with a web analytics system.

2. Description of the Background Art

With the development of the Internet, a number of new business models for producing sales and generating revenue have been developed. For example, it is now commonplace for search engines to allow advertisers to purchase keywords and display their associated advertising in response to searches or queries on such keywords. The pricing of such keywords can vary depending on a number of factors including the number of advertisers that want to purchase such keywords, the number of searches including such keywords and other factors. Presently, the management of such keywords is largely performed manually with human users inputting keywords. For example, keywords are currently managed using any one of a number of spreadsheet or document formats. Users typically list the keywords in a document or spreadsheet, then convert the document, so the keywords are listed in a format such as comma-separated values, and finally, that data is converted and uploaded into a search engine. Therefore, since large advertising campaigns can have tens of thousands of keywords as part of an Internet marketing strategy, it would be very cumbersome to manage such keywords in a manual fashion is, as described above.

Referring now to FIG. 1, a conventional scheme used by search engines to pair keywords with text or advertisements is shown. Typically, an advertiser will purchase a number of keywords (keyword 1 to keyword n) according to prices provided by the search engines. The advertiser will also provide one or more ads/text. Then responsive to search inputs by users the search engine will choose, based on the selected keyword, one of the ads/text from a list provided by the advertiser. In the prior art, the search engine randomly pairs keywords with ads/text or selects the ads last text on a rotating basis: first using ad 1, next using ad 2, next using ad 3, etc. until the nth ad is used and returns to ad 1.

Referring now to FIG. 2, the operation of the constituent components is shown in more detail. In a first step, the keyword is selected based on the search criteria input by the user. Then in a next step, an ad/text is selected from a list of possible advertisements. The keyword-ad pair is then provided as part of the web page to the user.

One particular problem for companies is that they often run concurrent advertising campaigns that utilize numerous keywords. Even though the advertising campaigns are unrelated, it is very valuable for the advertisers or companies to group keywords across multiple advertising campaigns (inter-campaign), as well as provide other groupings of keywords, such that a variety of web analytic statistics for such keywords can be reviewed and analyzed. While existing search engines provide a user interface for inputting the keywords into such search engine systems, these user interfaces typically separate the campaigns in a hierarchy. Within this hierarchy, there is limited flexibility to group keywords according to the needs of the advertisers and companies. The keywords are typically grouped by the campaign—and only within that campaign is there an ability to provide groupings of keywords. The prior art does not provide any ability to group keywords across different campaigns. Thus, there is a need for systems and methods that can classify keywords across multiple campaigns to provide greater flexibility in the analysis of web data.

SUMMARY OF THE INVENTION

The present invention overcomes the deficiencies and limitations of the prior art by providing a classification manager for managing keywords across multiple campaigns. In one embodiment, the system comprises a classification manager, a bid management system, a web analytics tool and a search engine. The classification manager interfaces with both the bid management system and the web analytics tool to provide user interfaces for reviewing data about specific keywords across multiple campaigns. The classification manager includes a classification keyword repository, a classification creation module, a classification measurement module and a classification user interface module for generating the user interface. This is particularly advantageous because statistics corresponding to keywords can be classified across multiple campaigns to provide greater flexibility in the analysis of web data. The present invention also includes a novel method for the classification of keywords across multiple campaigns.

BRIEF DESCRIPTION OF THE DRAWINGS

The present invention is illustrated by way of example, and not by way of limitation in the figures of the accompanying drawings, in which like-reference numerals are used to refer to similar elements.

DETAILED DESCRIPTION OF THE PREFERRED EMBODIMENTS

A classification manager and a method for using the same are described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention. For example, the present invention is described primarily with reference to printing documents for reading.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will be apparent from the description below. In addition, the present invention is not described with reference to any particular programming language. It will be appreciated that a variety of programming languages may be used to implement the teachings of the invention as described herein.

Moreover, the present invention claimed below may operate on or work in conjunction with an information system or network. For example, the invention can operate as a server or communicate with a network with additional functionality depending on the configuration. Thus, the present invention is capable of operating with any information system from those with minimal functionality to those providing all the functionality disclosed herein.

System Including the Classification Manager

Figure 1:
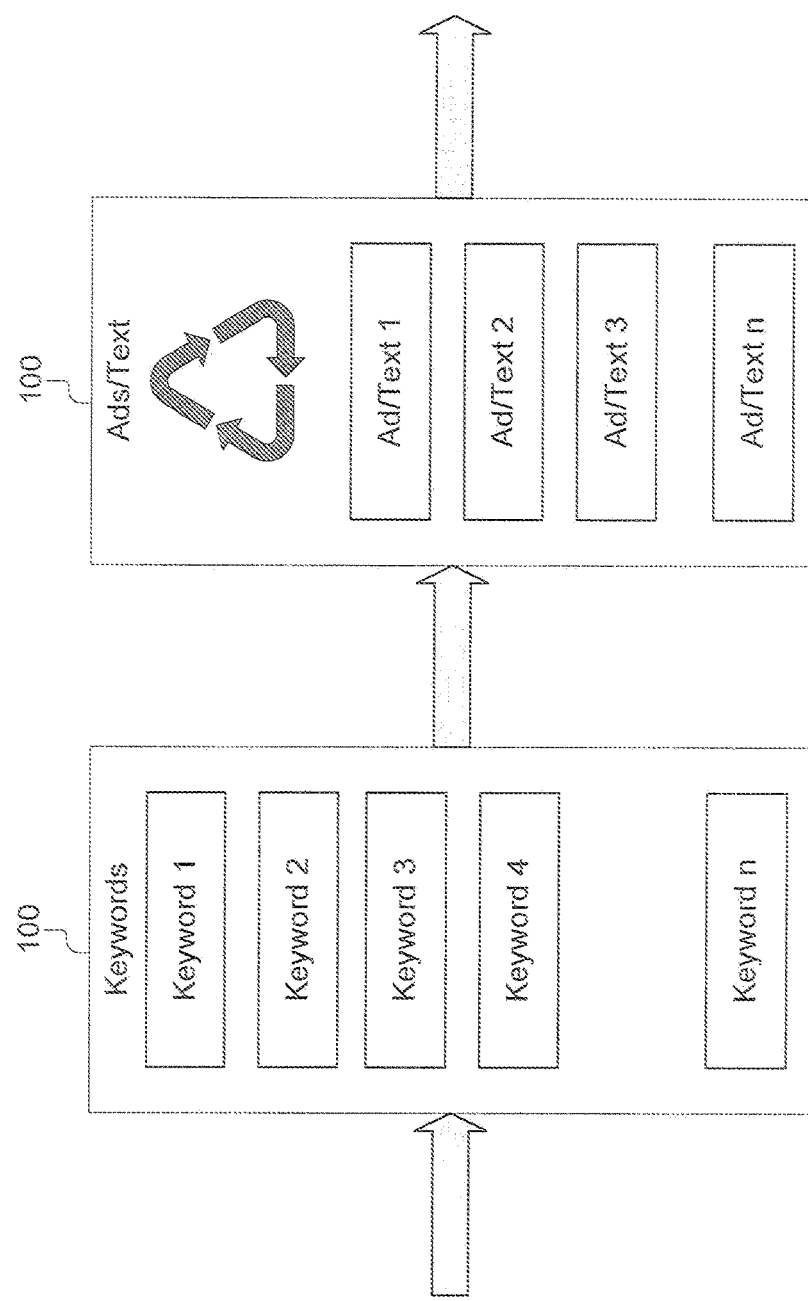
FIG. 1 is a block diagram of a conventional scheme used by search engines to pair keywords with text or advertisements.
Figure 2:
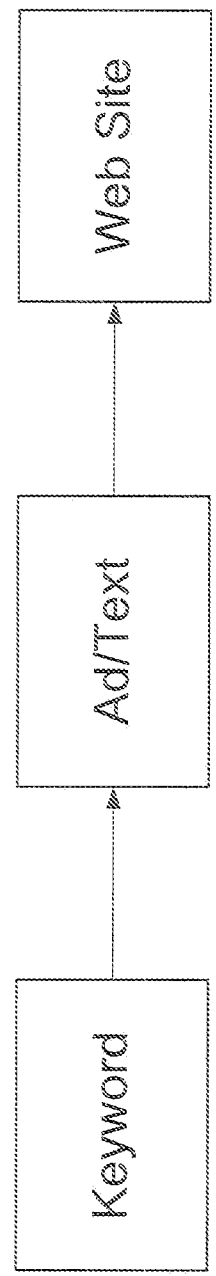
FIG. 2 is block diagram of a conventional flow for buying keywords and creating web pages.
Figure 3:
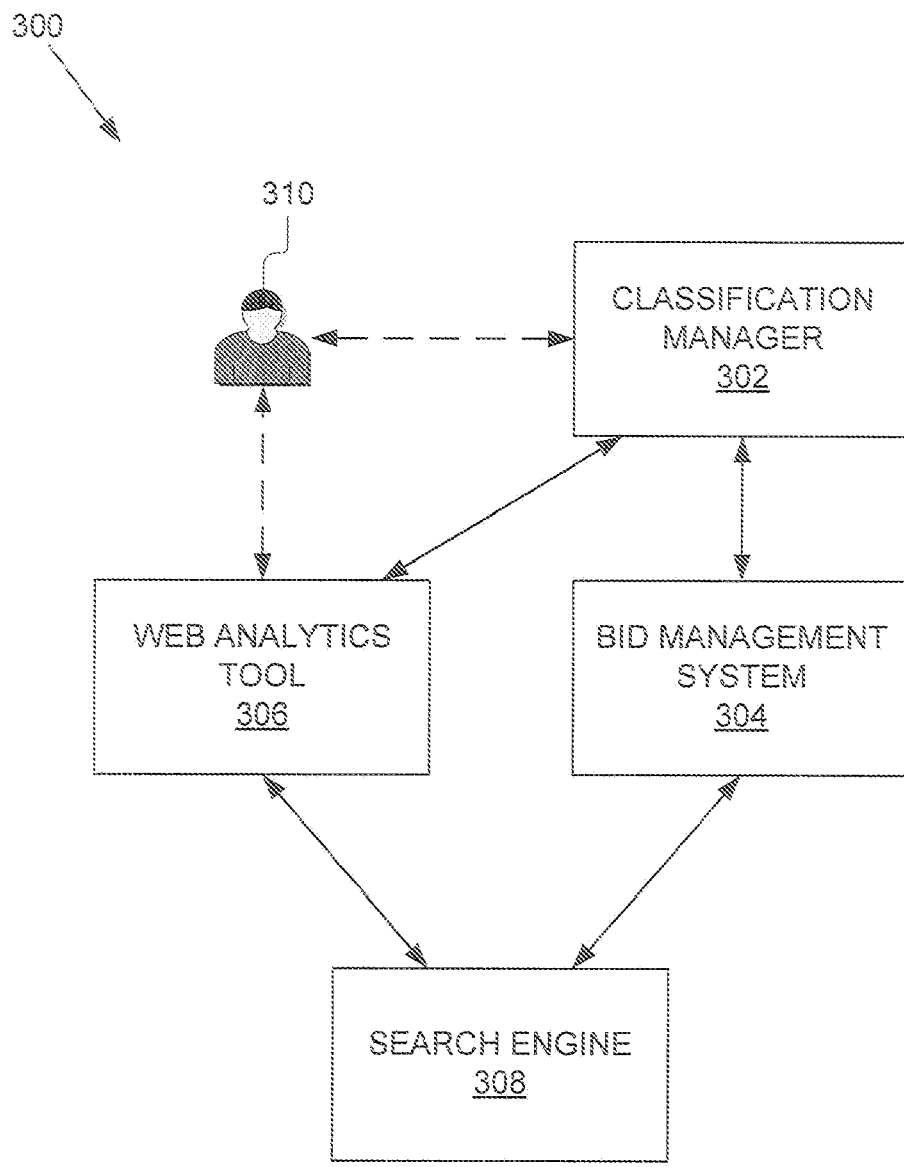
FIG. 3 is a block diagram of an embodiment of the system according to the present invention including a classification manager.

The present invention overcomes the shortcomings of the prior art by providing a system 300 and methods for creating and managing classifications of keywords across multiple campaigns for a search engine 308. FIG. 3 shows a system 300 in accordance with an embodiment of the present invention. The system 300 comprises a classification manager 302, a bid management system 304, a web analytics tool 306 and a search engine 308. A user 310 interfaces (as delineated with the dashed lines) with the classification manager 302 and the web analytics tool 306. The user 310 interacts with the classification manager 302 to select keywords, associate the keywords with a classification, and create advertising campaigns that will be described in detail below. The user 310 interacts with the web analytics tool 306 to track and monitor traffic over a user's web site.

In one embodiment, the classification manager 302 is adapted for communication with the search engine 308, the bid management system 304 and the web analytics tool 306 for classification of keywords across multiple campaigns and tracking web site visitation statistics related to specific keywords. In one embodiment, the classification manager 302 allows keywords used in Internet advertising campaigns to be classified across multiple campaigns. The classifications are user-definable as to what keywords are included in each classification. As shown in FIG. 3, the classification manager 302 interfaces with the bid management system 304 to provide user interfaces for reviewing data about specific keywords and their classifications. The classification manager 302 is also coupled to the web analytics tool 306 to measure performance and monitor use and traffic across a user's website with regard to the specific keyword (s). The classification manager 302 advantageously collects statistics and tracks keywords independent of the campaign in which the keywords are used. Once collected, the statistics can then be divided, arranged and presented to the user 310 according to the classifications defined by the user 310. The process for both defining a classification and viewing web analytics data according to user-defined classifications are performed by the classification manager 302 and described in more detail below with reference to FIGS. 6 and 7.

The present invention is particularly advantageous because by allowing the user to define classifications for keywords, the effectiveness of different keywords in the context of relationships to other keywords, products or other information can be compared. This is especially advantageous, since the classifications of keywords are user-definable. This invention allows the user to group keywords as desired into different classifications such that the classifications match other groupings of the user. In one embodiment, the classification can be created by the user (as needed) to match other groupings of keywords that the user is interested in tracking that may mirror a company's organizational structure, particular groupings of goods that have high margins, groupings of goods by type (e.g., sports/non-sports), groupings of goods from multiple advertising campaigns (aggregation of campaigns), a product lifecycle, the product rollout or replacement plant, and any other grouping of keywords that the user may be interested in tracking. The classification manager provides specific information about which combination of keywords generated specific Web traffic, such as traffic that generated a sale. This is particularly advantageous because the keywords that generate a large number of sales can be reused to generate future traffic. Similarly, keywords/classifications that do not generate Web traffic can be eliminated from the words that are purchased by the advertiser. Thus, the present invention greatly reduces the uncertainty presently provided by keyword purchasing schemes offered by present-day search engines.

The present invention also includes a user interface that can be used to view Web statistical data corresponding to a keyword as defined within a classification, or even a sub-classification. This user interface is particularly advantageous for identifying keywords that either generate significant amounts of Web traffic, or generate no traffic—as has been noted above. Such an example of user interface will be described below with reference to FIG. 11.

The classification manager 302 is adapted to communicate with the bid management system 304. For example, the bid management system 304 may be SearchCenter, manufactured by Omniture, Inc. of Orem, Utah. Portions of the bid management system 304 will be described below with reference to FIGS. 8-11. The bid management system 304 is operatively connected to a search engine 308 and communicates with the search engine 308 for the purchase and placement of keywords, transfer of advertising content and collecting keyword and traffic statistics. The bid management system 304 is also coupled to the web analytics tool 306.

The classification manager 302 is also adapted to communicate with the web analytics tool 306. As an example, SiteCatalyst manufactured by Omniture, Inc. of Orem, Utah can be used as a web analytics tool 306. The web analytics tool 306 is software that measures the behavior of visitors at a website. In particular, the software measures which aspects of the website work towards the business objectives; for example, which pages encourage people to make a purchase. The web analytics tool 306 is also coupled to the search engine 308.

The web analytics tool 306 and bid management system 304 are adapted to communicate with the search engine 308. The search engine is a conventional type such as an Internet search engine like those provided by Google, Microsoft Search or Yahoo.

Figure 4:
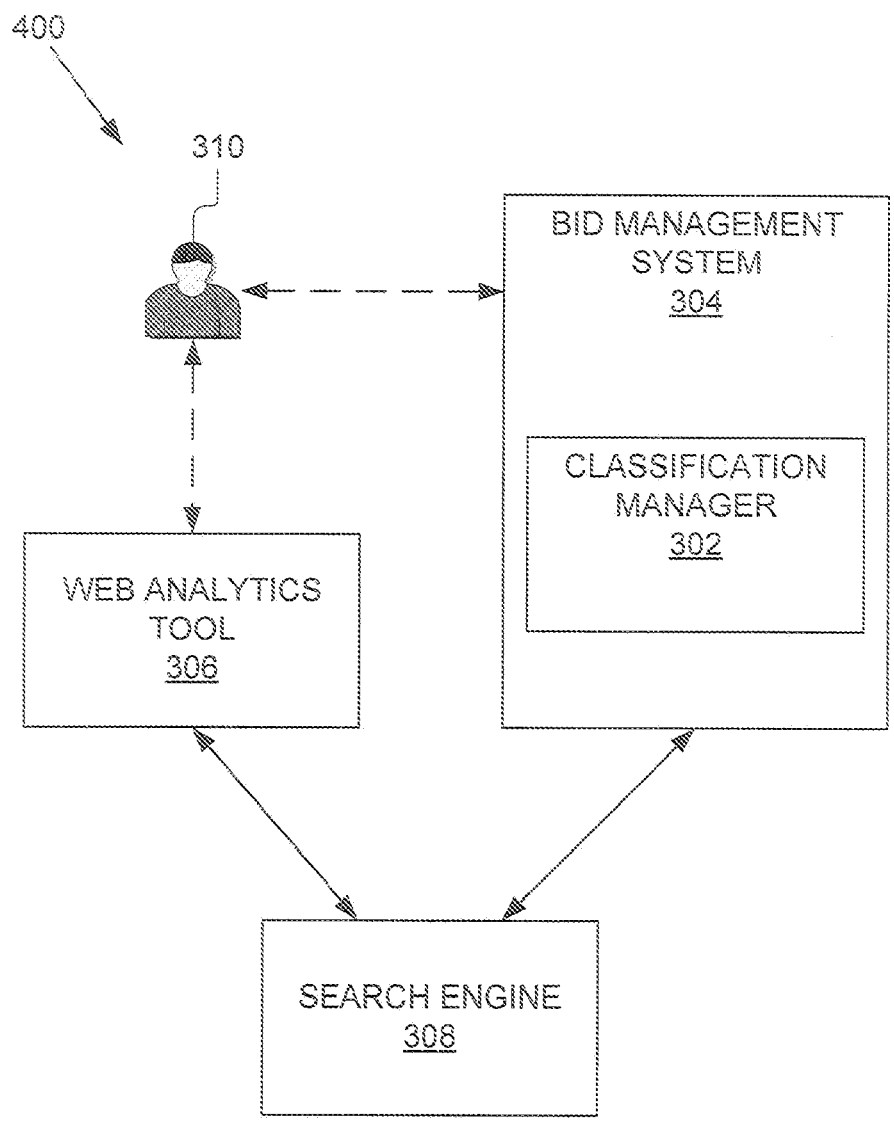
FIG. 4 is a block diagram of an embodiment of the system according to the present invention having a bid management system including the classification manager.

FIG. 4 shows a system 400 in accordance with another embodiment of the present invention. The system 400 has the same functionality as has been described above for system 300; however, in system 400, the classification manager 302 is part of and integrated into the bid management system 304.

Figure 5:
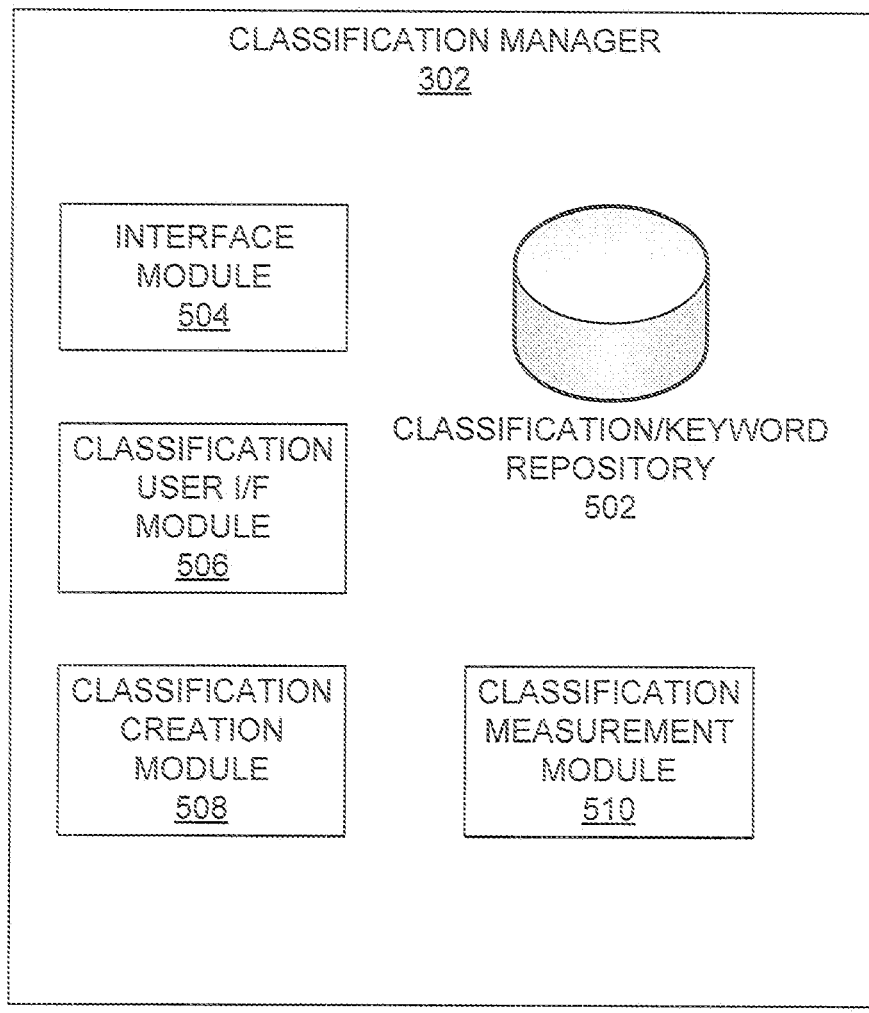
FIG. 5 is a block diagram of an embodiment of the classification manager in accordance with the present invention.

Referring now to FIG. 5, an embodiment of the classification manager 302 is shown in more detail. The classification manager 302 comprises a classification and keyword repository 502, an interface module 504, a classification user interface module 506, an classification creation module 508 and a classification/keyword measurement module 510.

The classification and keyword repository 502 is a storage device for storing classifications, sub-classifications, classification names, keywords associated with a classification and other information associated with the classification. While the present invention is described here and throughout this application as including classifications of keywords into groups, it should be understood the invention is equally applicable to the nesting of classifications any number of levels deep and that other classifications at the same level have exclusive or overlapping groupings of keywords. For example, the classification and keyword repository 502 is used to store a unique data structure for the classifications that includes fields for a classification name, a list of key words of arbitrary length, a list of zero or more related or nested classifications, text, a campaign title, descriptions, etc. The information stored in the classification and keyword repository 502 can be re-used for different campaigns or for the same classification to other keyword groupings. The classification and keyword repository 502 is adapted for communication with the other components of the classification manager 302. The classification and keyword repository 502 can also be accessed by the web analytics tool 306 and bid management system 304.

In one embodiment, the interface module 504 is adapted for communication with the web analytics tool 306, the bid management system 304 and the search engine (s) 308, such as using APIs. The interface module 504 interacts with the web analytics tool 306 to retrieve web analytics information related to the keywords and classifications. The interface module 504 interacts with the bid management system 304 to track what keywords are parts of which campaign, track the usage of the keywords, purchase keywords and interact with the search engine 308.

The classification user interface module 506 is a software program operational on the classification manager 302 and enables communication with the user 310. The classification user interface module 504 generates and presents a graphical user interfaces and accepts inputs from the user 310 that will be described below for an example embodiment in FIGS. 8-11. The inputs from the user are sent by the classification user interface module 506 to the appropriate component of the classification manager 302 that processes the data. The classification user interface module 506 also presents a user interface in which the user 310 can manage keywords across multiple campaigns. For example, the user 310 may also determine: whether a keyword is used, set a maximum cost per click (CPC), select a bid strategy or other aspects and information related to the use of a keyword irrespective of what campaigns the keyword is using.

The classification creation module 508 is a software tool for creating a classification including different interfaces to solicit data from the user and to interact with the bid management system 304 and the search engine 308. In one embodiment, the classification creation module 508 creates a classification data structure, adds data from the user to the classification data structure and stores the classification data structure in the classification and keyword repository 502. As noted above, the classifications are user-definable including classification names, keywords in the classification, statistics to be generated for the classification, etc. The classification creation module 508 receives data from the user via the classification user interface module 506, and uses the data to populate the classification data structure. The operation of the classification creation module 508 is described below with reference to FIGS. 6, 8 and 9. The classification creation module 508 is adapted for communication with the interface module 504, the classification user interface module 506, the classification and keyword repository 502 and the classification measurement module 510. Using additional information commonly used for different classifications that is stored in the classification and keyword repository 502, the process of creating new classifications is greatly simplified. Using the information from the classification measurement module 510, the user 310 can increase the effectiveness of keywords, by reviewing the metrics for keyword that are being selected for re-use in new campaigns.

The classification measurement module 510 is a software tool for measuring the usage of keywords across multiple ad campaigns. The classification measurement module 510 is advantageous because it is able to measure different metrics directly on a keyword basis and organize that information according to categories or classifications defined by the user. The classification measurement module 510 is coupled via the interface module 504 to the web analytics tool 306 to retrieve usage metrics of the keywords. The classification measurement module 510 uses conventional capabilities available in the web analytics tool 306 to retrieve web analytics metric such as cost-per-click (CPC), impressions (each time an advertisement loads on a user's screen), clicks, click-through rate (CTR), cost, etc. The classification measurement module 510 is adapted for communication with the web analytics tool 306 to retrieve data about keywords, and is adapted for communication with the classification and keyword repository 502 to identify keywords and other information on a classification basis.

Method for Creating and Using Classifications

Figure 6:
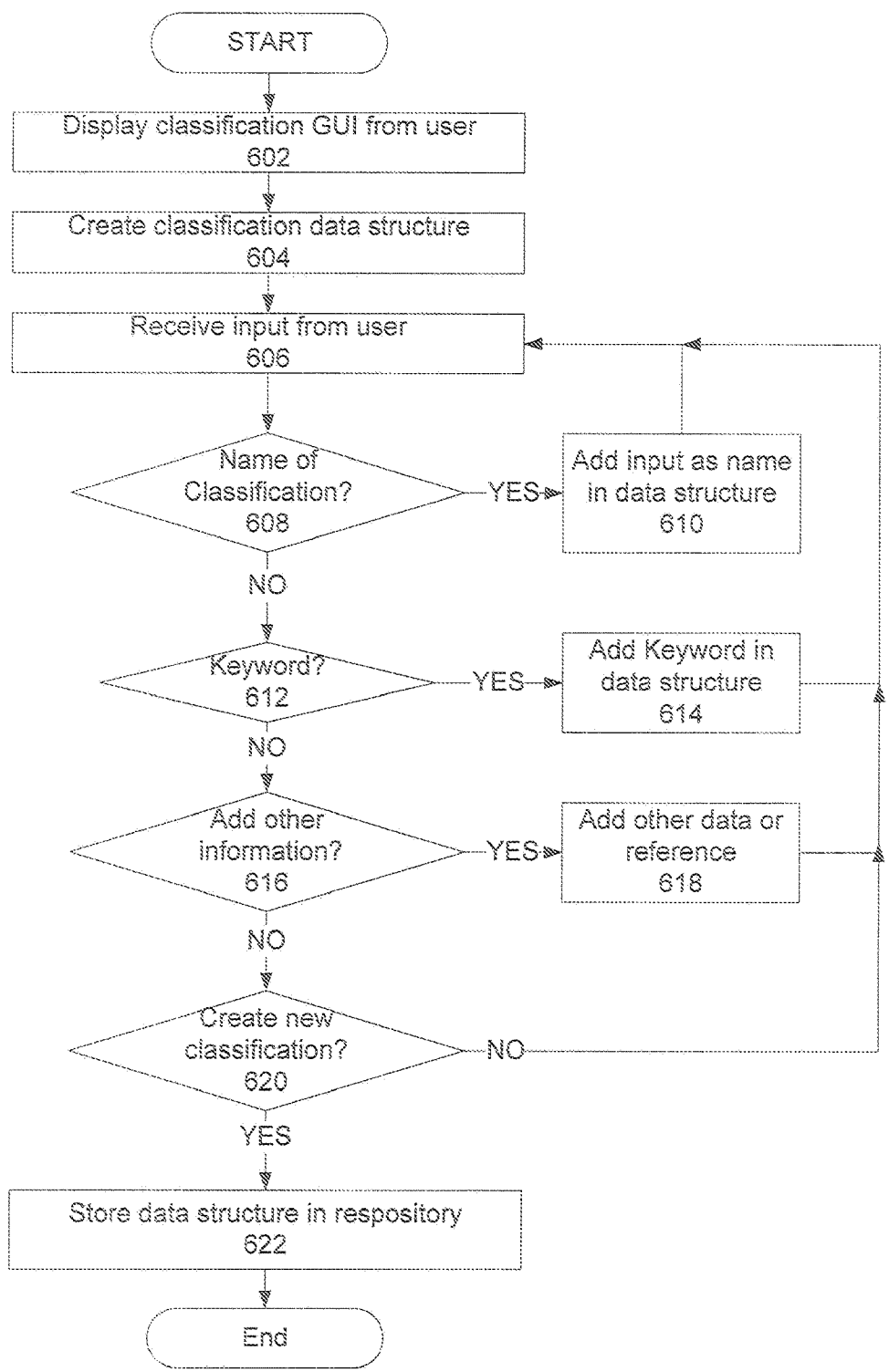
FIG. 6 is a flowchart of an embodiment of a method for creating a classification for keywords across multiple campaigns in accordance with the present invention.
Figure 8:
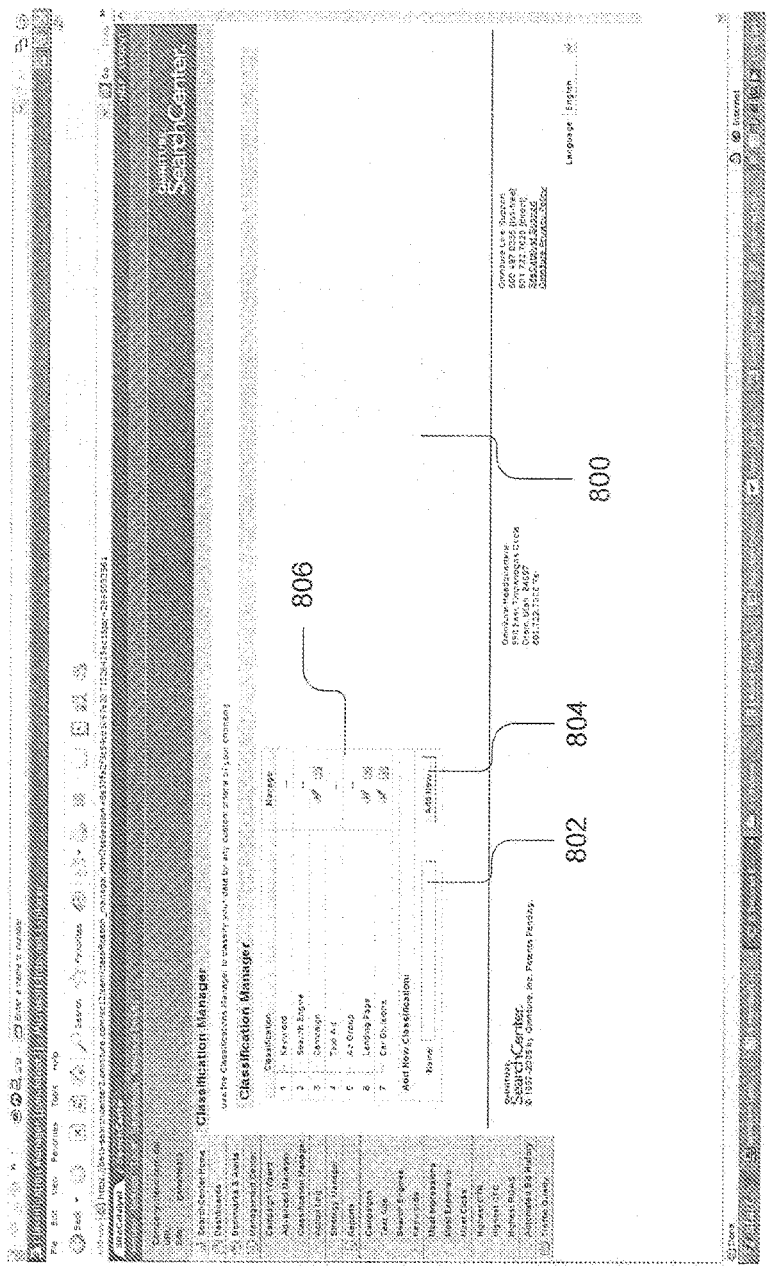
FIG. 8 is example graphical user interface for creating a classification across multiple campaigns in accordance with an embodiment of the present invention.
Figure 9:
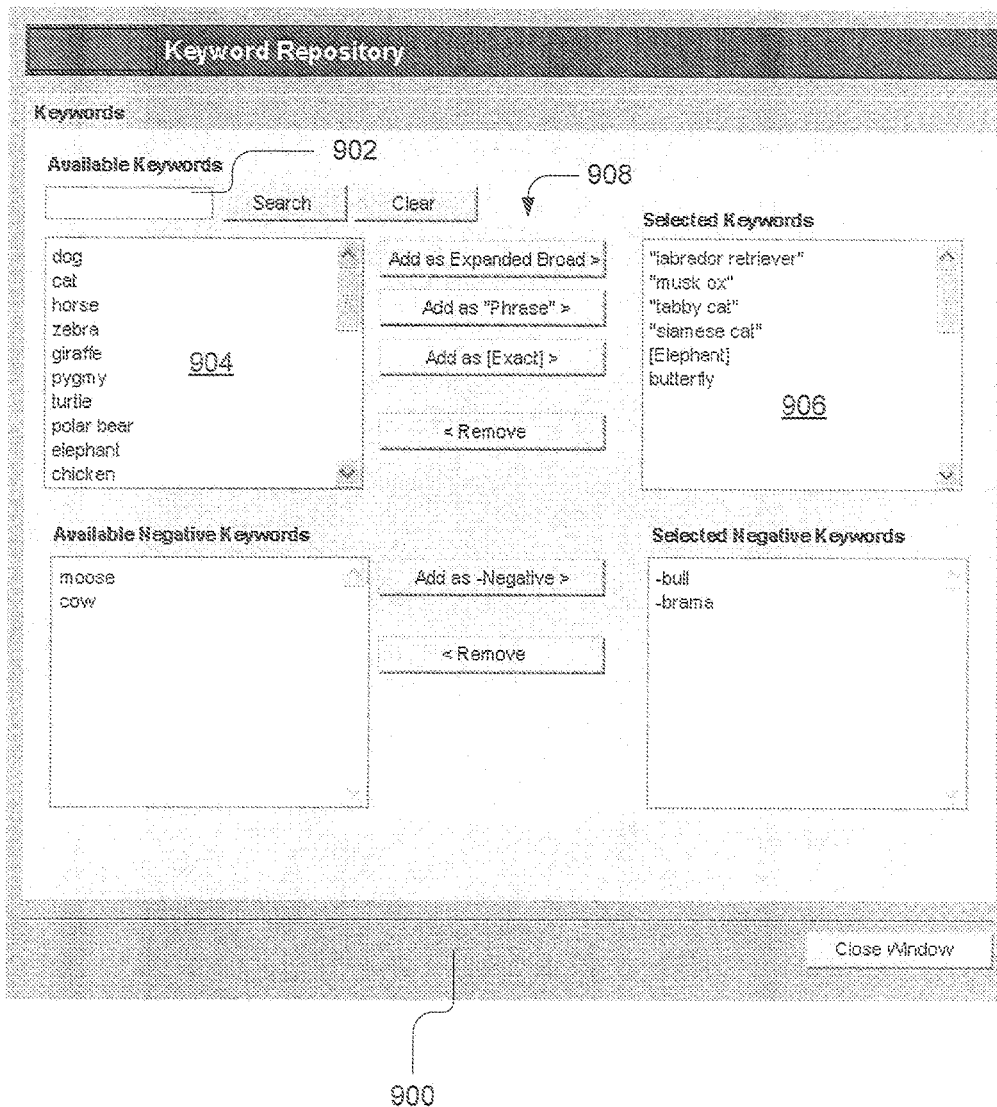
FIG. 9 is example graphical user interface for adding keywords to a classification across multiple campaigns in accordance with an embodiment of the present invention.

Referring now to FIG. 6, one embodiment of a method for creating a classification of keywords in accordance with the present invention will be described. The method begins by displaying 602 a classification graphical user interface, such as shown in FIG. 8. The classification graphical user interface 602 allows the user 310 to input data necessary for the creation of classification. The system 300 then creates 604 a classification data structure as it was described above. The system 300 then receives 606 inputs from the user. The method for determines whether the input was the name for the classification. If the input is the name for the classification, then the method proceeds to step 610 to add the input as the name of the classification in the data structure after which the method returns to step 606 to receive more input from the user 310. If the input was not the name for the classification, the method determines 612 whether the input was the addition of a keyword to the classification. If so, the method adds the input keyword in the data structure after which the method continues in step 606 to receive more input from the user 310. In one embodiment, the keywords are provided in a series of windows as shown in FIG. 9 with one for the keywords in use, and another for the keywords selected in this classification. Those skilled in the art will recognize that the same keyword may be in multiple different classifications. If the input was not the addition of a keyword, the method determines 616 whether additional information is being added to the classification. Such additional information could be a sub-classification, metrics about the classification to be generated or calculated, or any other information. If so, the method adds 618 the other data or reference to the data structure after which the method returns to step 606 to receive more input from the user 310. If not, the method continues and determines 620 whether the input is to create a new classification. If not, the method returns to step 606 to receive additional input from the user. If so, the method stores 622 the created data structure in the repository 502 and the method is complete.

Figure 7:
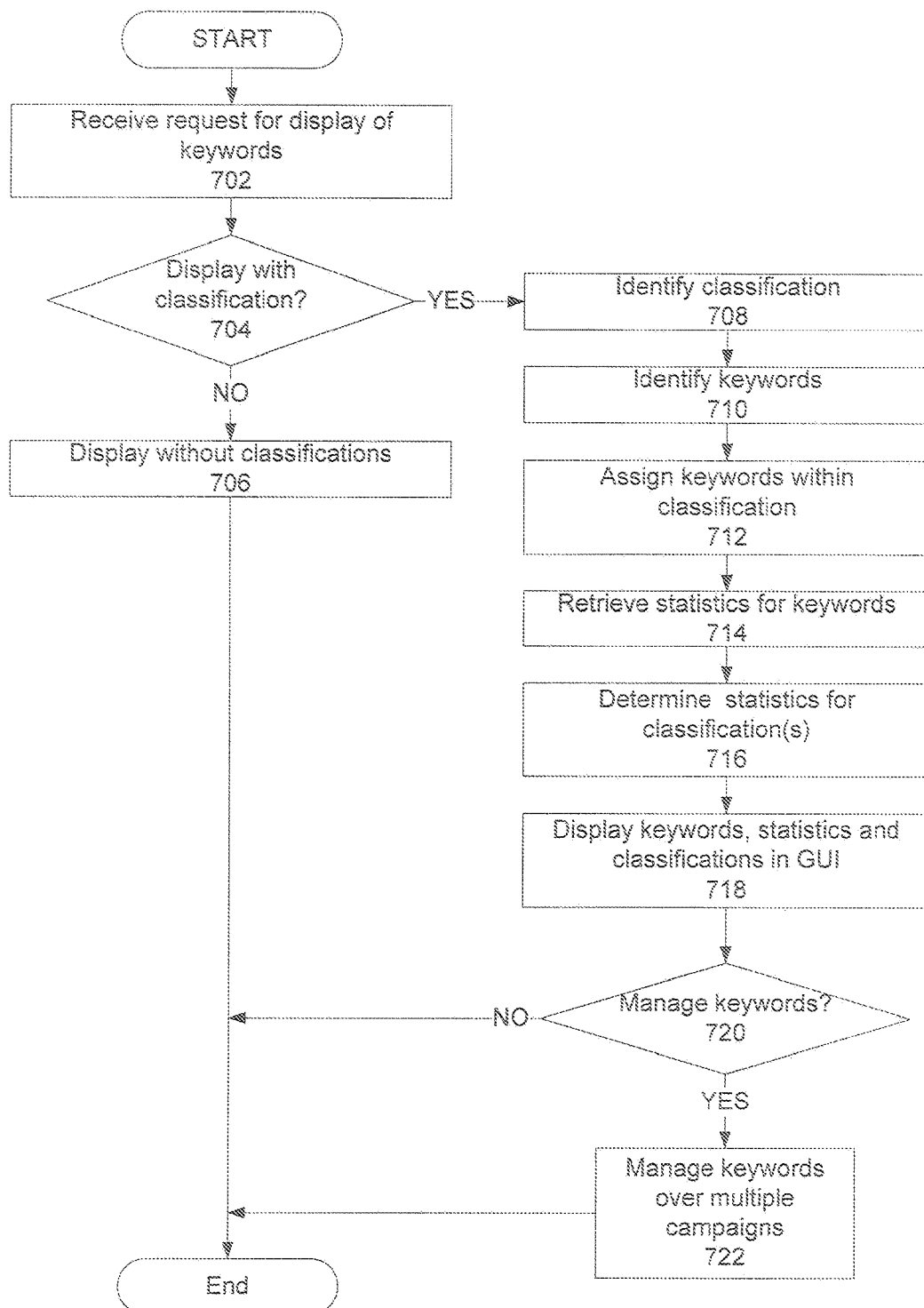
FIG. 7 is a flowchart of an embodiment of a method for generating a display of a classification for keywords across multiple campaigns in accordance with the present invention.

Referring now to FIG. 7, one embodiment of a method for displaying keywords and other metrics across multiple campaigns is shown. The method begins by receiving 702 a request for the display of keywords from the user. Next, the method determines 704 whether a classification exists for particular keywords and whether the user 310 has asked for display of the keywords within the classification. If not, the method displays 706 the keywords without classification (as shown for one example in FIG. 10) and the method is complete and ends. However, if the user 310 asked for display of the keywords within the classification, the method continues by identifying 708 the classifications that the user 310 has defined. In one embodiment, the user may share a classification or make a classification a default so that it may be used by others. Then the method identifies 710 the keywords associated with the classification. Then the keywords are assigned 712 within a particular classification according to the classification data structure. While this method is being described in the context of a single classification, those skilled in the art will recognize that there may be multiple classifications, and therefore, keywords must be assigned to the proper classification. Next, the statistics and other web analytics data are retrieved 714 for each keyword. This can be done on a keyword basis or in bulk. Then the statistics or other data are determined 716 for the classifications. The classifications may include subtotals, averages, median, etc., of data for the keywords that are within the classification. These statistics and other information are determined by doing computations, comparisons, additional searching or other operations. Then the classifications, keywords, statistics and other information are displayed 718 in the GUI of the present invention, an example of which is provided in FIG. 11. Next the method determines 720 whether the user has input information or has chosen to manage the keywords from the GUI of the present invention. If not, the method is complete and ends. If so, the GUI of the present invention can be used to manage 722 keywords, and the classification manager 302 interacts with the bid management system 304 to manage the use of keywords according to input by the user such as setting a CPC for a particular keyword, activating or deactivating a keyword, selecting a strategy etc.

Example Embodiment and User Interfaces

Referring now to FIGS. 8-11 examples of embodiments for different graphical user interfaces presented by the system 300 of the present invention are shown.

The classification function of the present invention provides the users 310 with the capability to group the business relevant keywords together and operate them more efficiently. For example, if an advertiser such as GM has 3 different campaigns running at the same time, like the "Employee pricing campaign", the "No money down campaign" and the "0% financing campaign", then in Google or Yahoo, these campaigns are created and managed as 3 different entities in each of the search engines 308.

Using the same example, all 3 campaigns will have similar key words that would include vehicle names. Without the classification capabilities of the present invention, users 310 need to manage the same keywords in multiple places and are not be able to analyze the same keywords as a group. For example, the Chevrolet team would not be able to manage and track their vehicles, Cadillac, their corresponding vehicles and Hummer, their own vehicles in a single interface.

As shown in the screens of FIGS. 8-11, classification functionality of the present invention can easily group these groups of vehicles under "Car Divisions" classification for easy management.

FIG. 8 shows example graphical user interface 800 for creating a classification across multiple campaigns in accordance with an embodiment of the present invention. This interface 800 allows the user to create different types of classifications relevant to their business, for example, classifications for products, brands, types, business divisions, etc. The user interface 800 provides field 802 for the user to input the name of the classification. The user interface also provides a button to initiate the process for creating a new classification 804. The user interface 800 for creating a classification also includes an area 806 for presenting information about the classification such inputting any custom criteria such as (but not limited to) keyword, search engine, campaign, text ad, ad group, landing page, or other classifications such as "car divisions." Those skilled in the art will understand that the custom criteria provided in the interface 800 are only by way of example, and that alternate embodiments may include any other variety of criteria upon which information may be classified for web analytics purposes.

FIG. 9 is example graphical user interface for adding keywords to a classification across multiple campaigns in accordance with an embodiment of the present invention. The user begins the process of creating a classification of keywords using the interface 800 shown in FIG. 8. Once that interface 800 has been used to name a classification, the interface 900 of FIG. 9 is displayed and presented to the user 310. This interface 900 advantageously has a layout tailored to identify keywords to be added to the classification. Although not shown, this interface 900 can also provide an indication as to which classification keywords are being added to or removed from a classification such as "car divisions," for example. In one embodiment, the present invention drives the user 310 to enter keywords. Users can enter keywords manually in field 902, or select from a window 904 that is populated with keywords that have been or are being used. Once the keywords are selected for inclusion, they are added to the selected keywords window 906. A plurality of buttons provides for the addition or removal of keywords in various different formats as will be recognizable to those skilled in the art.

Figure 10:
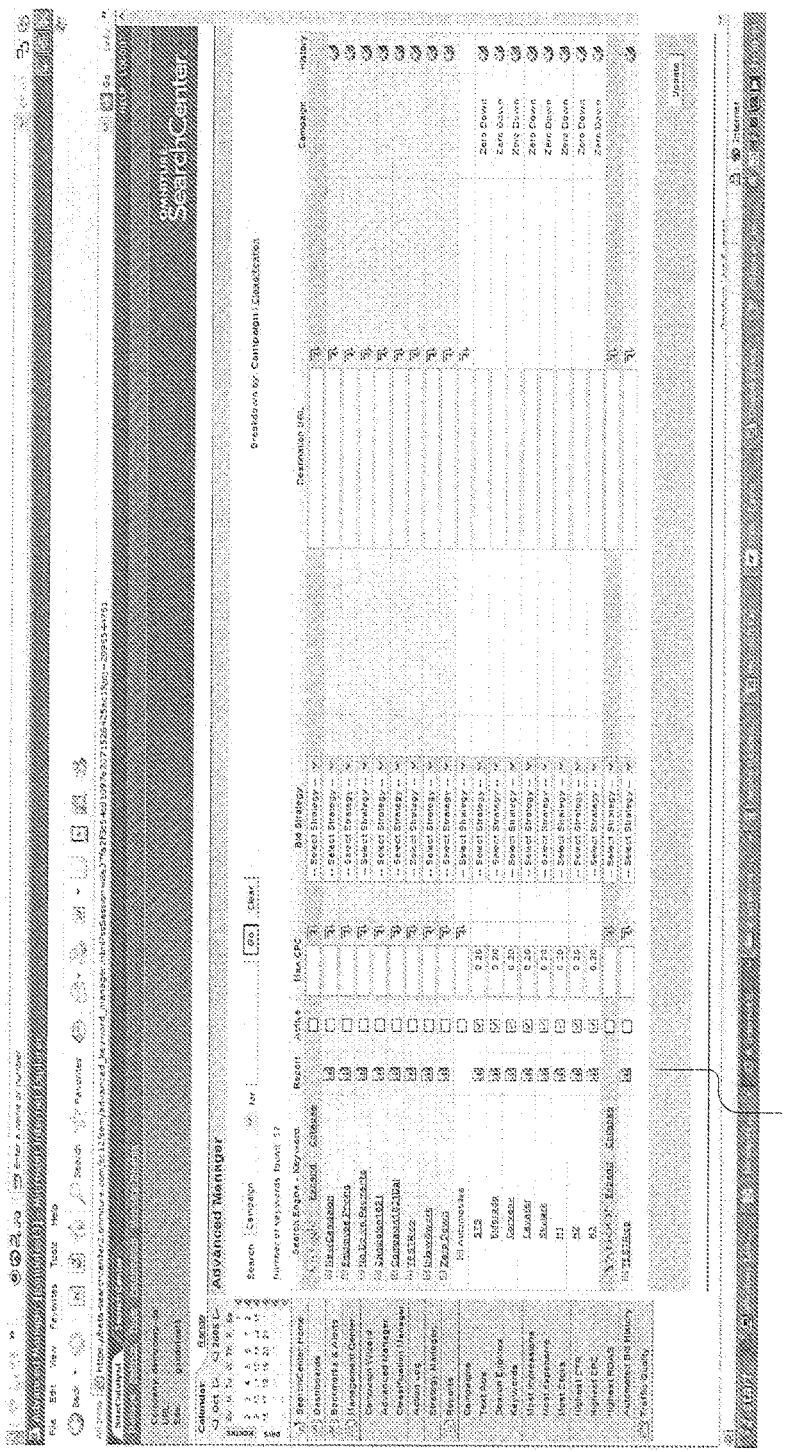
FIG. 10 is example graphical user interface for displaying statistics about keywords without classification in accordance with an embodiment of the present invention.

FIG. 10 shows an example graphical user interface 1000 for displaying statistics about keywords without classification in accordance with an embodiment of the present invention. The graphical user interface 1000 shows how the data will appear in one campaign if there is no classification. All brands are shown under the campaign. The brands can be separated through ad groups in Google for example, but there will still be duplicate groups with duplicate keywords in different campaigns on different search engines 308 that would require separate management even though they are the same. Furthermore, the user 310 must toggle between on such interface 1000 for each campaign, and it is difficult if not impossible to effectively compare and combine information across different search engines and different campaigns.

Figure 11:
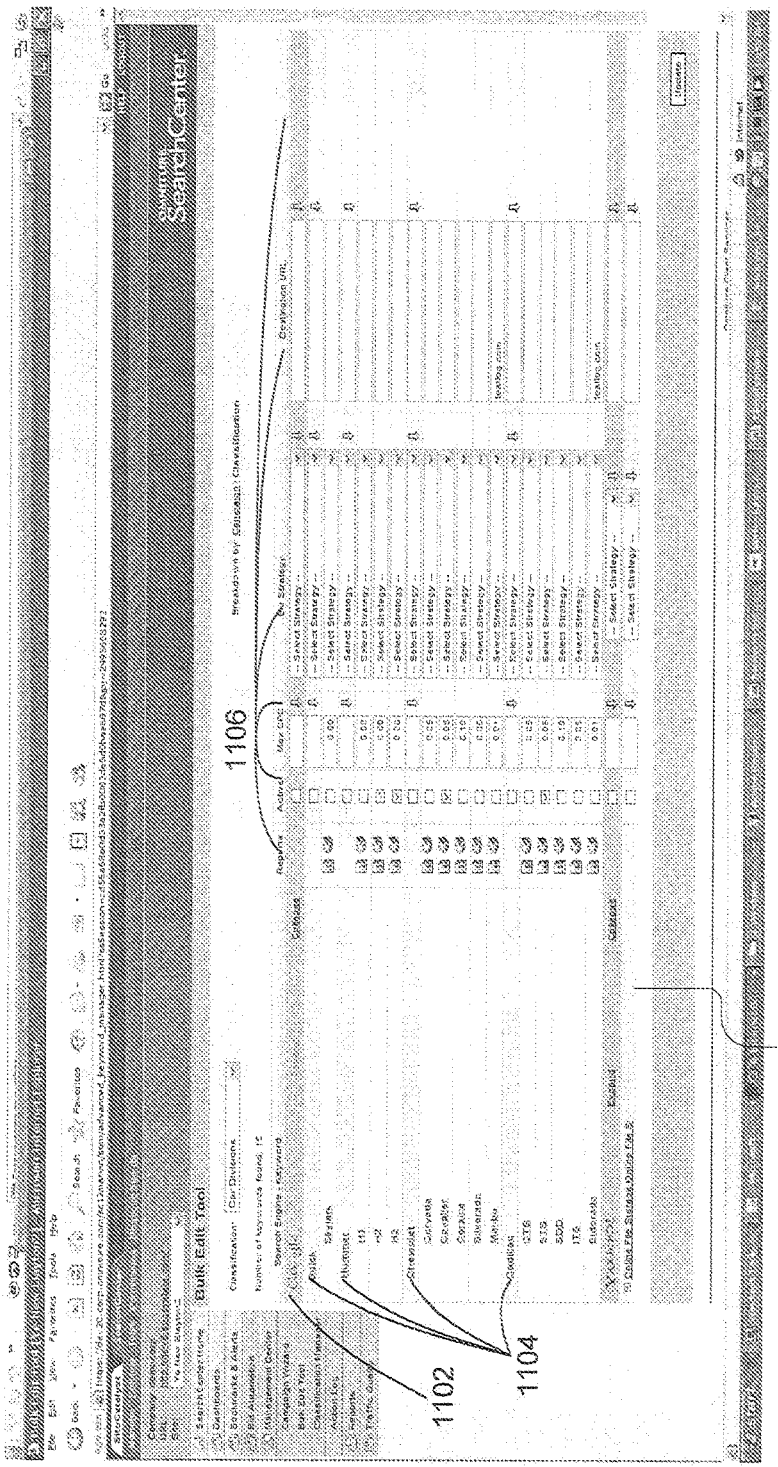
FIG. 11 is example graphical user interface for displaying statistics about keywords with classification in accordance with an embodiment of the present invention.

FIG. 11 shows an example graphical user interface 1100 for displaying statistics about keywords with a classification in accordance with an embodiment of the present invention. The system 300 provides the user interface 1100 for viewing keywords, and creates new hierarchical views for reviewing the keywords. More particularly, the interface 1100 is shown displaying a previously created "car divisions" classification and assigning the keywords to relevant divisions where keywords are grouped for better management and analysis. As can be seen, the top-level 1102 of a hierarchy indicates the search engine 308 with which the classification manager 302 is interacting. At the next level 1104 in a hierarchy, the present invention provides any number of user-definable classes or classifications. To or within these classes or classifications, keywords that have been purchased with the search engine 308 at the root node can be added. This hierarchical view also includes a variety of other attributes 1106 such as reports, whether the keywords are currently active, bid strategy, destination URL and other information that can be used in reviewing the advertising strategy across multiple campaigns. Those skilled in the art will recognize there is a variety of other data that may be grouped according to the same classifications to allow the user to review and analyze the value of particular keywords across multiple campaigns. In an alternate embodiment not shown, the present invention also allows for the nesting of user created classifications of keywords.

The foregoing description of the embodiments of the present invention has been presented for the purposes of illustration and description. It is not intended to be exhaustive or to limit the present invention to the precise form disclosed. Many modifications and variations are possible in light of the above teaching. For example, the present invention may include additional interfaces that may be adapted for use with additional search engines. It is intended that the scope of the present invention be limited not by this detailed description, but rather by the claims of this application. As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats. Furthermore, (as will be apparent to one of ordinary skill in the relevant art,) the modules, routines, features, attributes, methodologies and other aspects of the present invention can be implemented as software, hardware, firmware or any combination of the three. Of course, wherever a component, (an example of which is a module), of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present invention is in no way limited to implementation in any specific programming language, or for any specific operating system or environment. Accordingly, the disclosure of the present invention is intended to be illustrative, but not limiting, of the scope of the present invention, which is set forth in the following claims.

What is claimed is:

1. A system, comprising:
   a bid management system for managing purchase of a plurality of keywords by an advertiser in a plurality of campaigns of the advertiser, wherein each of the plurality of keywords corresponds to one or more campaigns of the plurality of campaigns, wherein the bid management system is implemented by a processor coupled to a computer readable storage medium storing computer program code executable by the processor to implement the bid management system;
   a web analytics tool for collecting web site visitation statistics for the keywords from across the plurality of campaigns, wherein the web analytics tool is implemented by a processor coupled to a computer readable storage medium storing computer program code executable by the processor to implement the web analytics tool; and
   a classification manager for communication with the web analytics tool and the bid management system, the classification manager being implemented by a processor coupled to a computer readable storage medium storing computer program code executable by the processor to implement the classification manager, the computer program code of classification manager executable for performing the steps of:
      receiving input from the advertiser indicating a subset of the plurality of keywords and a classification name, wherein at least one of the keywords of the indicated subset is a multi-campaign keyword corresponding to two or more of the plurality of campaigns;
      in response to said receiving, creating a classification associating the subset of keywords with the classification name as classified keywords;
      retrieving from the web analytics tool, website visitation statistics for the subset of classified keywords, including for the multi-campaign keyword, the website visitation statistics including at least:
   a measure of behavior of users who visited a first website, at least in part, due to advertisement served by a search engine in response to purchase of the multi-campaign keyword from the search engine as part of a first of the plurality of advertising campaigns; and
   a measure of behavior of users who visited a second website, at least in part, due to advertisement served by a search engine in response to purchase of the multi-campaign keyword from the search engine as part of a second of the plurality of advertising campaigns, wherein the second website is distinct from the first website;
determining from the website visitation statistics a first aggregate measure of user behavior for the multi-campaign keyword, wherein the first aggregate measure is calculated based at least on both of the measures of user behavior retrieved from the web analytics tool and associated with the first and second websites;
determining a second aggregate measure of user behavior for the classification based on website visitation statistics associated with the plurality of keywords; and
providing the information about the classification to a computing device of the advertiser, the provided information causing the computing device of the advertiser to display in a same report the second aggregate measure in association with the classification and the first aggregate measure in association with the multi-campaign keyword.

2. The system of claim 1, wherein the classification manager includes a classification user interface module for presenting the classification as a hierarchical display with the classification name at a level, and one or more of the classified subset of keywords at a sub-level.

3. The system of claim 2, wherein the classification user interface module is adapted to receive input and manage keywords based on the input.

4. The system of claim 1, wherein the plurality of campaigns are on a plurality of search engines; and
wherein the information about the classification provided by the classification manager includes the subset of keywords and the classification name, and the classification manager presents the classification as a hierarchical display with the classification name at a level, and the classified keywords at a sub-level.

5. The system of claim 1, wherein the classification manager includes a repository for storing the classification and at least one of the subset of classified keywords associated with the classification.

6. The system of claim 1, wherein the classification manager includes classification creation module for creating the classification including the classification name, the subset of classified keywords, and one or more types of measures of behavior of users.

7. The system of claim 1, wherein each of the first aggregate measure of user behavior and the second aggregate measure of user behavior includes one from the group of cost-per-click (CPC), impressions, clicks, click-through rate (CTR), page hits, and cost.

8. The system of claim 1, wherein the classification manager includes a keyword measurement module for determining each of the first aggregate measure of user behavior and the second aggregate measure of user behavior, the keyword measurement module adapted for communication with the web analytics tool.

9. The system of claim 1, wherein the classification manager provides information about a plurality of classifications, each classification having a respective subset of the plurality of keywords.

10. The system of claim 9, wherein at least one of the plurality of classifications includes a sub-classification.

11. A method for classifying keywords across multiple campaigns, the method comprising:
performing by one or more computers:
   receiving, from a computing device of an advertiser, a classification name and a plurality of keywords for association with the classification name, wherein the plurality of keywords includes a multi-campaign keyword associated with a plurality of advertising campaigns of the advertiser;
   in response to receiving the classification name and the plurality of keywords, creating a classification associating the plurality of keywords with the classification name; and
   in response to receiving, from the computing device of the advertiser, an input indicating the classification:
     (a) retrieving from a web analytics tool, website visitation statistics for the multi-campaign keyword, the website visitation statistics including at least:
       a measure of behavior of users who visited a first website, at least in part, due to advertisement served by a search engine in response to purchase of the multi-campaign keyword from the search engine as part of a first of the plurality of advertising campaigns; and
       a measure of behavior of users who visited a second website, at least in part, due to advertisement served by a search engine in response to purchase of the multi-campaign keyword from the search engine as part of a second of the plurality of advertising campaigns, wherein the second website is distinct from the first website;
     (b) determining from the website visitation statistics a first aggregate measure of user behavior for the multi-campaign keyword, wherein the first aggregate measure is calculated based at least on both of the measures of user behavior retrieved from the web analytics tool and associated with the first and second websites;
     (c) determining a second aggregate measure of user behavior for the classification based on website visitation statistics associated with the plurality of keywords; and
     (d) providing information about the classification to the computing device of the advertiser, the provided information causing the computing device of the advertiser to display in a same report the second aggregate measure in association with the classification and the first aggregate measure in association with the multi-campaign keyword.

12. The method of claim 11, further comprising storing the information in a repository.

13. The method of claim 12, wherein the classification comprises a data structure including the classification name, the plurality of keywords associated with the plurality of campaigns, a type of the first aggregate measure of user behavior and the second aggregate measure of user behavior, and other classification information.

14. The method of claim 11, wherein each of the first aggregate measure of user behavior and the second aggregate measure of user behavior is one from the group of cost-per-click (CPC), impressions, clicks, click-through rate (CTR), page hits and cost.

15. The method of claim 11, wherein providing information about the classification includes displaying the classification name in a hierarchical relationship to the plurality of keywords for the classification.

16. The method of claim 11, wherein providing information about the classification includes generating and displaying an overall value of the performance metric for a plurality of the keywords in the classification.

17. A non-transitory computer-readable storage medium having instructions stored therein, wherein said instructions are executable by a processor, the instructions executable for performing the steps of:

receiving, from a computing device of an advertiser, a classification name and a plurality of keywords for association with the classification name, wherein the plurality of keywords includes a multi-campaign keyword associated with a plurality of advertising campaigns of the advertiser;

in response to receiving the classification name and the plurality of keywords, creating a classification associating the plurality of keywords with the classification name; and in response to receiving, from the computing device of the advertiser, an input indicating the classification:
  (a) retrieving from a web analytics tool, website visitation statistics for the multi-campaign keyword, the website visitation statistics including at least:
    a measure of behavior of users who visited a first website, at least in part, due to advertisement served by a search engine in response to purchase of the multi-campaign keyword from the search engine as part of a first of the plurality of advertising campaigns; and
    a measure of behavior of users who visited a second website, at least in part, due to advertisement served by a search engine in response to purchase of the multi-campaign keyword from the search engine as part of a second of the plurality of advertising campaigns, wherein the second website is distinct from the first website;
  (b) determining from the website visitation statistics a first aggregate measure of user behavior for the multi-campaign keyword, wherein the first aggregate measure is calculated based at least on both of the measures of user behavior retrieved from the web analytics tool and associated with the first and second websites;
  (c) determining a second aggregate measure of user behavior for the classification based on website visitation statistics associated with the plurality of keywords; and
  (d) providing information about the classification to the computing device of the advertiser, the provided information causing the computing device of the advertiser to display in a same report the second aggregate measure in association with the classification and the first aggregate measure in association with the multi-campaign keyword.

18. The non-transitory computer-readable storage medium of claim 17, wherein the providing information about the classification includes displaying the classification name in a hierarchical relationship to the plurality of keywords for the classification.

19. The non-transitory computer-readable storage medium of claim 17, wherein providing information about the classification includes generating and displaying an overall value of the performance metric for a plurality of the keywords in the classification.

20. The non-transitory computer-readable storage medium of claim 17, wherein each of the first aggregate measure of user behavior and the second aggregate measure of user behavior is one from the group of cost-per-click (CPC), impressions, clicks, click-through rate (CTR), page hits and cost.

* * * * *